(12) United States Patent
Deshpande et al.

(10) Patent No.: US 9,209,608 B2
(45) Date of Patent: Dec. 8, 2015

(54) CLAMPING DEVICE HAVING A PAIR OF SCREWS ACTUATING A PAIR OF HOOKS TO CLAMP A DIN RAIL TO A BASE MODULE

(71) Applicant: EMERSON ELECTRIC COMPANY, St. Louis, MO (US)

(72) Inventors: Atul Deshpande, Maharashtra (IN); Padmanabh Joshi, Maharashtra (IN)

(73) Assignee: EMERSON ELECTRIC COMPANY, St. Louis, MO (US)

( * ) Notice: Subject to any disclaimer, the term of this patent is extended or adjusted under 35 U.S.C. 154(b) by 0 days.

(21) Appl. No.: 14/360,491

(22) PCT Filed: Nov. 21, 2012

(86) PCT No.: PCT/IN2012/000759
§ 371 (c)(1),
(2) Date: May 23, 2014

(87) PCT Pub. No.: WO2013/102923
PCT Pub. Date: Jul. 11, 2013

(65) Prior Publication Data
US 2014/0357117 A1  Dec. 4, 2014

(30) Foreign Application Priority Data

Nov. 23, 2011 (IN) .......................... 3283/MUM/2011

(51) Int. Cl.
*H01R 9/26* (2006.01)
*H02B 1/052* (2006.01)

(52) U.S. Cl.
CPC .................. *H02B 1/052* (2013.01); *H01R 9/26* (2013.01); *H01R 9/2616* (2013.01)

(58) Field of Classification Search
USPC ..................... 439/532, 716, 717, 94
See application file for complete search history.

(56) References Cited

U.S. PATENT DOCUMENTS

| | | | | |
|---|---|---|---|---|
| 5,704,805 | A  * | 1/1998 | Douty et al. .................. | 439/532 |
| 7,674,129 | B1 * | 3/2010 | Liu ............................... | 439/532 |
| 7,686,626 | B2 * | 3/2010 | Wu et al. ...................... | 439/95 |
| 7,686,627 | B2 * | 3/2010 | Wu et al. ...................... | 439/95 |
| 8,011,951 | B2 * | 9/2011 | Moore et al. ................. | 439/532 |

* cited by examiner

*Primary Examiner* — Chandrika Prasad
(74) *Attorney, Agent, or Firm* — Marshall, Gerstein & Borun LLP

(57) ABSTRACT

A clamping device for mounting a base module on a DIN rail is disclosed. The clamping device includes a clamp base, actuator screws, push plates, clamping hooks, and springs. The clamp base is having a planar portion and side walls. The side walls of the clamp base is provided with serrations that indent into DIN rail flange. Further, the planar portion is provided with an aperture for affixing the clamp base to the base module. The pair of actuator screws rotate and pass through the planar portion of the clamp base for facilitating movement thereof with respect to the clamp base. Each push plate is secured to a corresponding actuator screw and is adapted to be either in lifted or seated configuration based on movement of the actuator screw. Each clamping hook includes a first end supported by corresponding push plate and second end movable between engaged disengaged configuration.

7 Claims, 26 Drawing Sheets

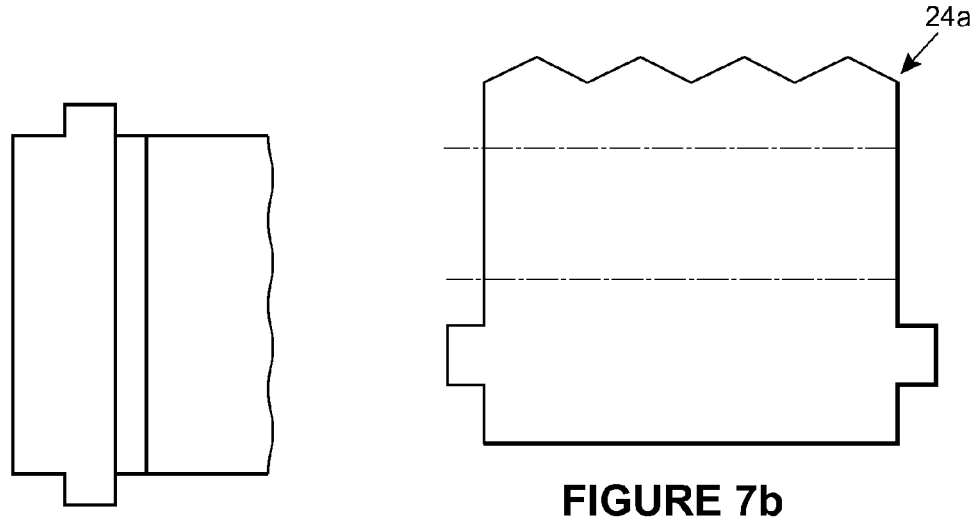
FIGURE 7a
FIGURE 7b
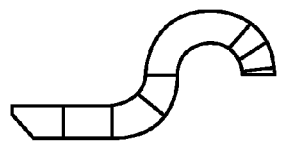
FIGURE 7c
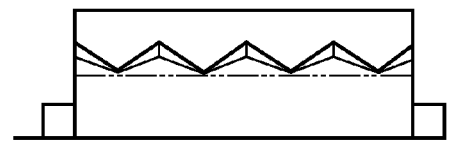
FIGURE 7d
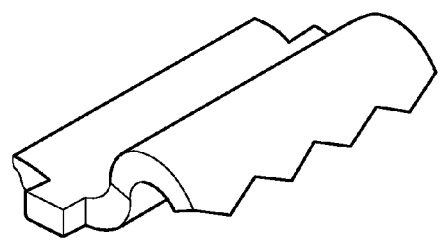
FIGURE 7e

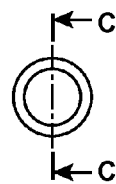
FIGURE 10b         FIGURE 10c
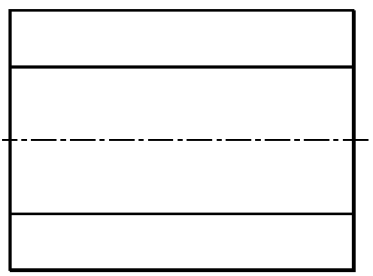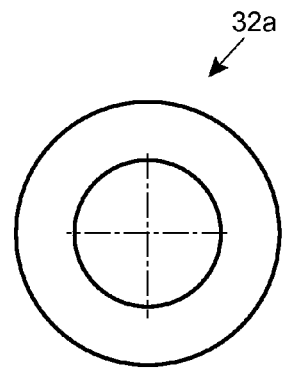
FIGURE 11a         FIGURE 11b
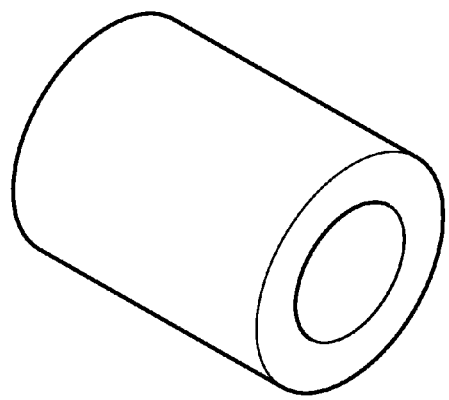
FIGURE 11c

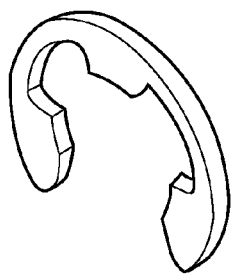
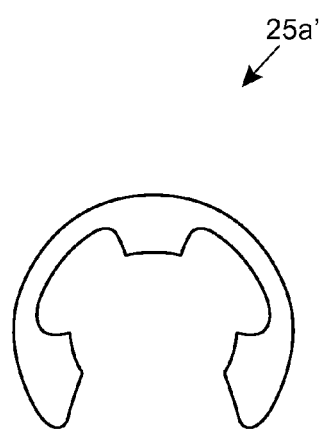
FIGURE 19a  FIGURE 19b
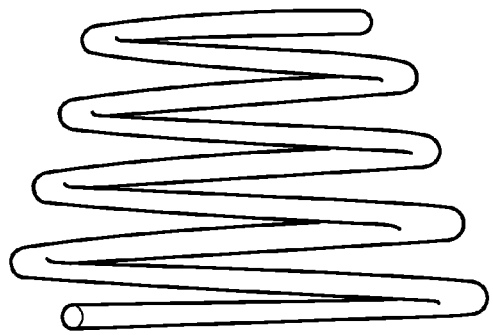
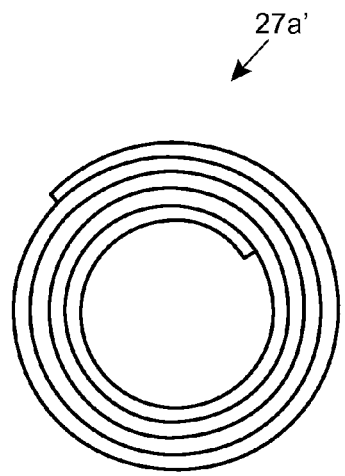
FIGURE 20a  FIGURE 20b

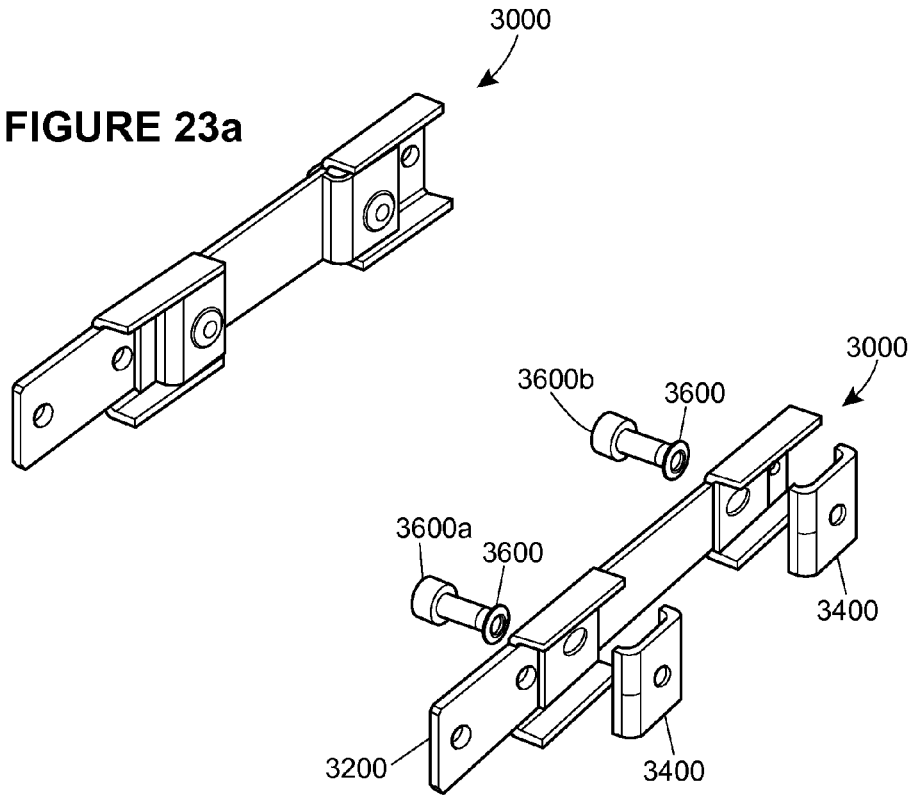
FIGURE 23a
FIGURE 23b
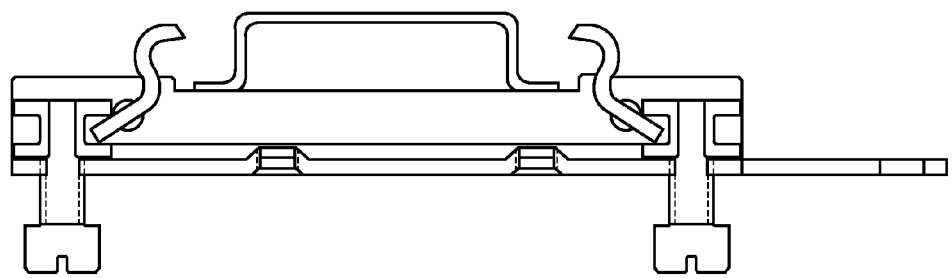
FIGURE 24

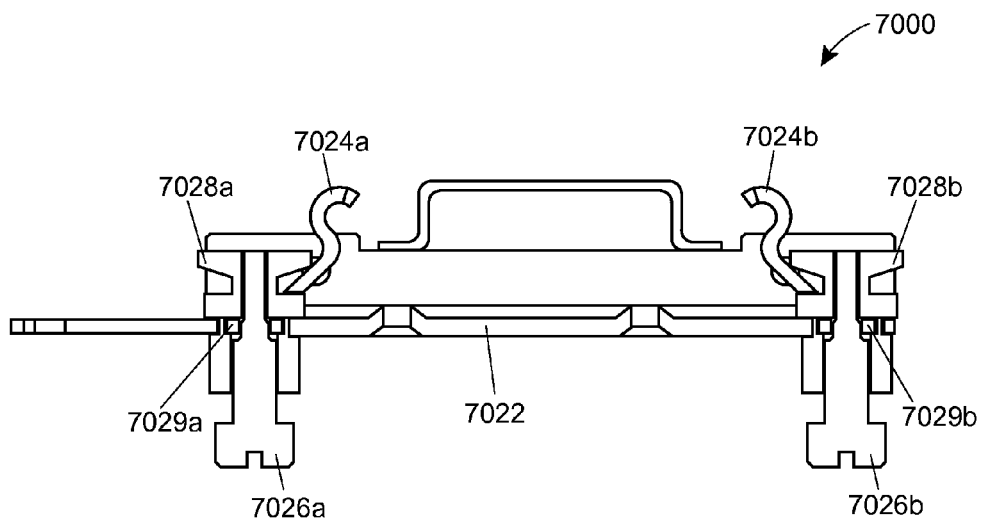
FIGURE 31
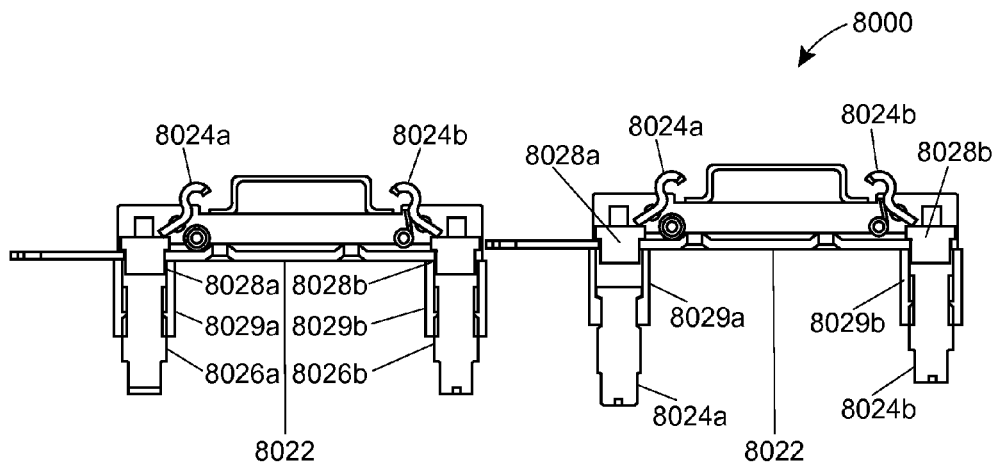
FIGURE 32a  FIGURE 32b

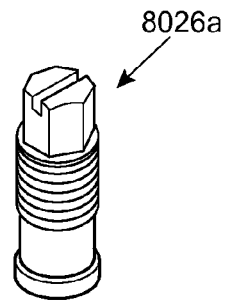
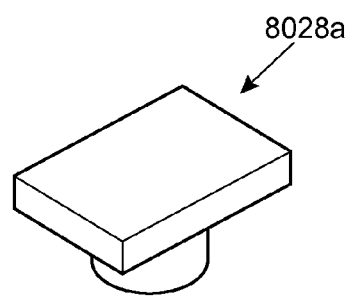
FIGURE 33a  FIGURE 33b
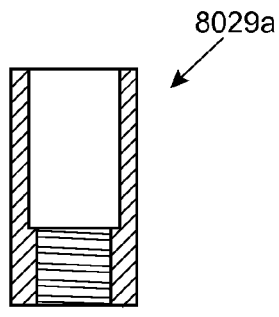
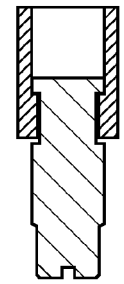
FIGURE 33c  FIGURE 33d

CLAMPING DEVICE HAVING A PAIR OF SCREWS ACTUATING A PAIR OF HOOKS TO CLAMP A DIN RAIL TO A BASE MODULE

FIELD OF THE DISCLOSURE

The present disclosure relates to a clamping device. More particularly, the present disclosure relates to a clamping device used for mounting circuit breakers and industrial control equipment to a DIN rail.

DEFINITIONS

DIN rail is a metal rail widely used for mounting circuit breakers and industrial control equipment, more particularly, DIN (Deutsches Institut für Normung) rail is an elongated conductive channel shaped member having side edge flange portions there-along to which connector engagement is made.

BACKGROUND OF THE DISCLOSURE

A large number of terminal blocks such as circuit breakers and industrial control equipment may be mounted on the DIN rail. The DIN rail makes possible a compact, organized arrangement of terminal blocks and other DIN rail mount components. This gives more than just the appearance of quality; it saves time and space, enhances design capabilities and provides a centralized connect-disconnect area. At the same time, the DIN concept allows designers to take advantage of constant advances in terminal block technology. More particularly, the DIN rail components do more than terminating wires. The DIN rail components distribute power and ground, protect against overloads and perform a host of other sophisticated functions. Whatever the application: control systems, instrumentation, automation, the DIN rail terminal blocks can be updated. However, mounting of a terminal block on a DIN rail is complicated. Various connectors are known in the prior art for mounting the DIN rail terminal blocks onto the DIN rail.

For example, the U.S. Pat. No. 5,704,805 having a priority date of 31 Mar. 1996 discloses a connector for connection to a rail. More particularly, the '805 US granted patent discloses an electrical connector for a DIN rail with rail flanges, including a body, a carrier vertically movable with respect to the body, an actuator and a pair of clamp members having rail-engageable hook portions. At least one of the clamp members is movable toward the other by the carrier upon actuation for mechanically and electrically clamping onto a respective rail flange. A pair of such clamp members may be cammed inwardly and upwardly along slots in side walls of body upon actuation, or the clamp members may include flanges pivotably held in body side wall holes for rotating the hook portions inwardly and upwardly against the rail flanges. Such connector is adapted to be mounted beneath a circuit board prior to being clamped onto the DIN rail. However, the connector of the prior art is expensive and fails to prevent unintended disengagement of the DIN rail terminal blocks/connector from the DIN rail.

Accordingly, there is a need for a clamping arrangement that is adapted to assuredly clamp the DIN rail terminal blocks/connector to the DIN rail, while permitting intentional removal of the DIN rail terminal blocks/connector from the DIN rail. Further, there is a need for a clamping arrangement that prevents unintended disengagement of the DIN rail terminal blocks/connector from the DIN rail.

OBJECTS OF THE INVENTION

An object of the present invention is to provide a reliable connection between DIN rail terminal blocks and DIN rail.

Still another object of the present invention is to provide a clamping device that assuredly clamps the DIN rail terminal blocks/connector to the DIN rail, while permitting intentional removal of the DIN rail terminal blocks/connector from the DIN rail.

Yet another object of the present invention is to provide a clamping device that prevents unintentional disengagement of the DIN rail terminal blocks/connector from the DIN rail.

Still another object of the present invention is to provide a clamping device that is simple in construction.

Another object of the present invention is to provide a clamping device that requires less torque application for loosening or tightening the clamp.

Still another object of the present invention is to provide a clamping device that is easy to manufacture.

Another object of the present invention is to provide a clamping device that facilitates easy engagement and disengagement of the DIN rail terminal blocks from the DIN rail.

Still another object of the present invention is to provide a clamping device that facilitates quick engagement disengagement of the DIN rail terminal blocks from the DIN rail.

Yet another object of the present invention is to provide a clamping device for mounting the DIN rail terminal blocks to the DIN rail that is inexpensive.

Another object of the present invention is to provide a clamping device for mounting the DIN rail terminal blocks to the DIN rail that is having a sturdy construction.

Still another object of the present invention is to provide a clamping device that can be used for all control room equipments and in applications where vibration requirements are stringent.

SUMMARY OF THE INVENTION

In accordance with one embodiment of the present invention, there is provided a clamping device affixed to a base module for mounting the base module on a DIN rail, wherein the DIN rail is an elongate channel having opposed co-planar flanges along sides thereof. The clamping device includes a clamp base, a pair of actuator screws, a pair of push plates, a pair of clamping hooks, and a pair of springs. The clamp base is having a planar portion and a pair of side walls upstanding from the planar portion for orthogonally supporting the co-planar flanges of the DIN rail. The side walls of the clamp base are provided with serrations that indent into DIN rail flange for facilitating better electrical contact. Further, the planar portion is provided with an aperture for affixing the clamp base to the base module. The pair of actuator screws are capable or rotating and passing through the planar portion of the clamp base, for facilitating inward and outward movement thereof with respect to the clamp base. Each of the push plates of the pair of push plates is provided with projections that fit into grooves provided on opposite side walls of said clamp base, further each of the push plates is secured on to a corresponding actuator screw and is adapted to be either in a lifted configuration or a seated configuration based on movement of the actuator screw. The pair of clamping hooks are hingeably supported between the side walls of the clamp base, wherein each clamping hook includes a first end supported by corresponding push plate and a second end provided with gripping jaws, the second end of the clamping hook movable between an engaged configuration in which the second end is engaging with either of the co-planar flanges of the DIN rail for facilitating clamping of the DIN rail and a disengaged configuration in which the second end of the clamping hook is adapted to disengage from either of the co-planar flanges of the DIN rail. Each spring of the pair of springs is supported on a spring pin disposed between the side walls of the clamp base, each spring is adapted to urge a corresponding clamping hook to a disengaged/open configuration when a corresponding push plate is in a seated configuration.

Typically, the pair of spacers are mounted on the spring pin to maintain the spring in operational configuration.

BRIEF DESCRIPTION

FIG. 1 of the accompanying drawings illustrates a base module assembly, wherein a DIN rail clamp in accordance with one embodiment of the present invention is used for securing DIN rail terminal blocks to a DIN rail;

FIG. 2 of the accompanying drawings illustrates a schematic representation of a DIN rail clamp in accordance with one embodiment of the present invention;

FIG. 3 of the accompanying drawings illustrates another view of the DIN rail clamp;

FIG. 4 of the accompanying drawings illustrates a top view of the DIN rail clamp of FIG. 2 aligned with respect to a DIN rail, wherein the DIN rail clamp is in an open configuration;

FIG. 5 of the accompanying drawings illustrates another view of the DIN rail clamp of FIG. 2 in an open configuration;

FIG. 7(a) illustrates a top view of the clamping hook of the DIN rail clamp of FIG. 2;

FIG. 7(b) illustrates a flat pattern view of the clamping hook of FIG. 7(a);

FIG. 7(c) illustrates a side view of the clamping hook of FIG. 7(a);

FIG. 7(d) illustrates a front view of the clamping hook of FIG. 7(a);

FIG. 7(e) illustrates an isometric view of the clamping hook of FIG. 7(a);

FIG. 10(b) illustrates a side view of the spring pin of FIG. 10(a);

FIG. 10(c) illustrates a sectional view of the spring pin along section line C-C of FIG. 10(a);

FIG. 11(a) illustrates a side view of a spacer mounted on a spring pin of the DIN rail clamp of FIG. 2;

FIG. 11(b) illustrates a top view of the spacer of FIG. 11(a);

FIG. 11(c) illustrates an isometric view of the spacer of FIG. 11(a);

FIG. 19(a) illustrates an isometric view of a sir-clip of the DIN rail clamp of FIG. 17;

FIG. 19(b) illustrates a top view of a sir-clip of FIG. 19a;

FIG. 20(a) illustrates an isometric view of a conical spring of the DIN rail clamp of FIG. 17 in an uncompressed state;

FIG. 20(b) illustrates another view of conical spring of FIG. 20(a) in a compressed state;

FIG. 23(a) illustrates an assembled view of a DIN rail clamp in accordance with still another embodiment of the present invention;

FIG. 23(b) illustrates an exploded view of the DIN rail clamp of FIG. 23(a);

FIG. 24 illustrates a DIN rail clamp in accordance with still another embodiment of the present invention;

FIG. 31 illustrates another view of the DIN rail clamp of FIG. 30(a) in an open configuration;

FIG. 32(a) illustrates a schematic representation of a DIN rail clamp in accordance with still another embodiment of the present invention;

FIG. 32(b) illustrates the DIN rail clamp of FIG. 32(a) with an actuation screw thereof in a free rotating position after release;

FIG. 33(a) illustrates an actuation screw used in the DIN rail clamp of FIG. 32(a);

FIG. 33(b) illustrates a button used in the DIN rail clamp of FIG. 32(a);

FIG. 33(c) illustrates a bush used in the DIN rail clamp of FIG. 32(a); and

FIG. 33(d) illustrates a actuation screw-bush assembly used in the DIN rail clamp of FIG. 32(a).

DETAILED DESCRIPTION

The invention will now be described with reference to the accompanying drawings which do not limit the scope and ambit of the invention. The description provided is purely by way of example and illustration.

Figure 1:
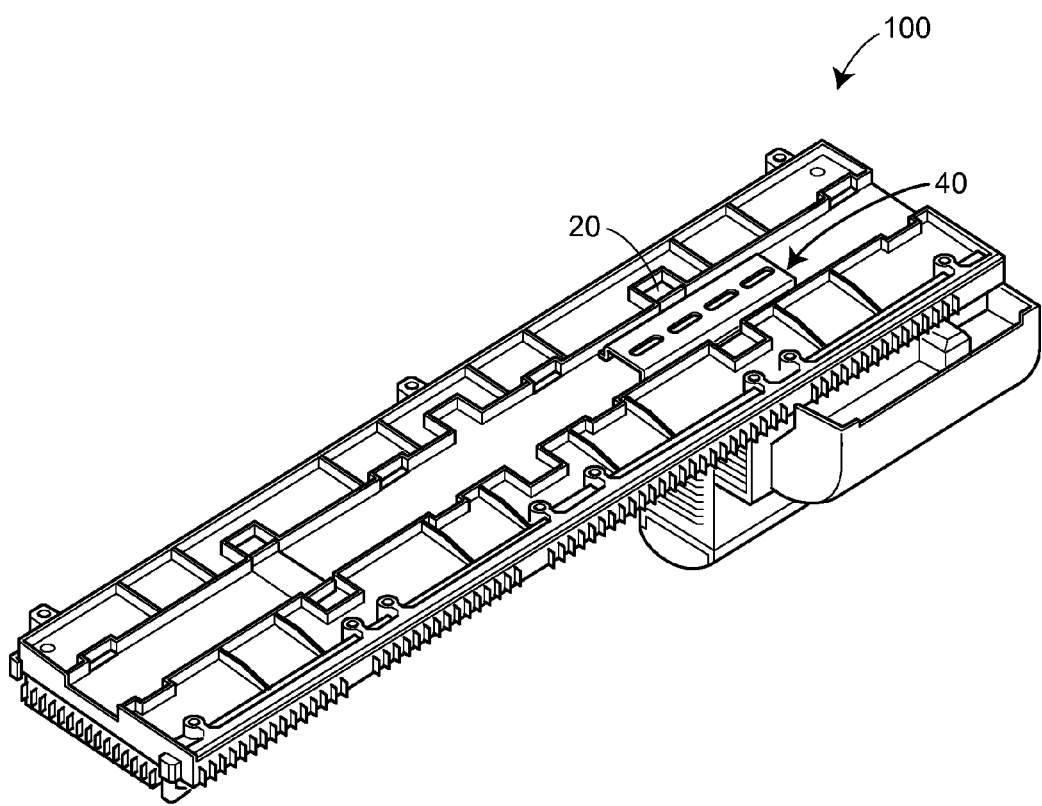
Figure 2:
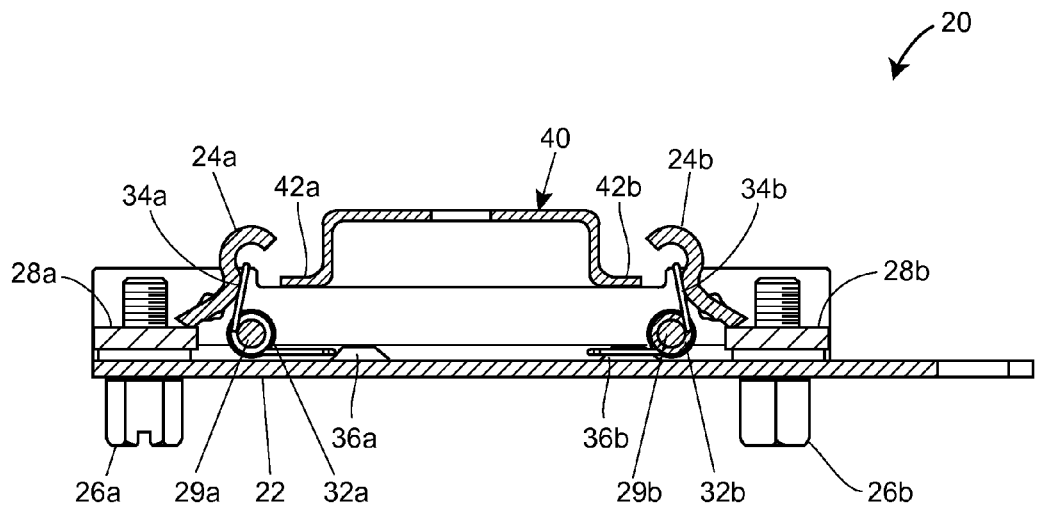
Figure 8A:
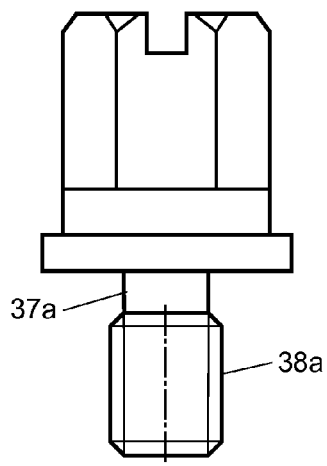
FIG. 8(a) illustrates a front view of an actuator screw of the DIN rail clamp of FIG. 2.
Figure 8B:
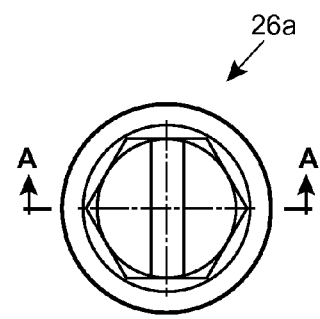
FIG. 8(b) illustrates a top view of the actuator screw of FIG. 8(a)
Figure 8C:
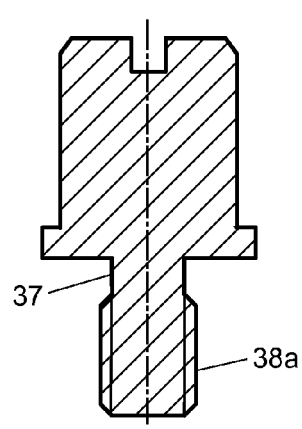
FIG. 8(c) illustrates a sectional view of the actuator screw along the section line A-A of FIG. 8(b)
Figure 8D:
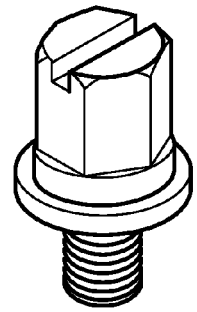
FIG. 8(d) illustrates an isometric view of the actuator screw of FIG. 8(a)

FIG. 1 of the accompanying drawings illustrates a base module assembly 100, wherein a DIN rail clamp 20 in accordance with one embodiment of the present invention is used for securing DIN rail terminal blocks to a DIN rail 40. Referring to FIG. 2 of the accompanying drawings, the DIN rail clamp 20 includes a clamp base 22, a pair of clamping hooks 24a and 24b, a pair of actuator screws 26a and 26b, a pair of push plates 28a and 28b, a pair of spring pins 29a and 29b, a pair of spacers 32a and 32b and a pair of springs 34a and 34b. The clamp base 22 of the DIN rail clamp 20 is further provided with a plurality of apertures for securing the base module to the DIN rail clamp 20. The clamp base 22 further includes apertures for facilitating passage of actuator screws there-through. Further, each of the actuator screws 26a and 26b includes a plain portion and a threaded portion (illustrated in FIG. 8(a) and FIG. 8(c), more particularly, the actuator screw 26a include a plain portion 37a and a threaded portion 38a, while the screw 26b include a plain portion 37b and a threaded portion 38b. The threaded portion 38a of the actuator screw 26a facilitates engagement of the actuator screw 26a with a corresponding push plate 28a.

The DIN rail clamp 20 is affixed to a base module and is adapted to facilitate mounting of the base module on the DIN rail 40, wherein the DIN rail 40 is an elongate channel having opposed co-planar flanges 42a and 42b along sides thereof.

Again referring to FIG. 2 of the accompanying drawings, the clamp base 22 of the DIN rail clamp 20 is a blank made from pressing operation, more particularly the clamp base 22 is made from CR steel EN42 material. However, the present invention is not limited to a particular method or material for configuring the clamp base 22. The clamp base 22 includes a planar portion and a pair of side walls upstanding from the planar portion for orthogonally supporting the co-planar flanges 42a and 42b of the DIN rail 40, further the planar portion of the clamp base 22 is provided with apertures 36a and 36b for affixing the clamp base 22 to the base module. The clamp base 22 further includes apertures for facilitating passage of actuator screws 26a and 26b there-through.

The DIN rail clamp 20 further includes the screws 26a and 26b, the screws 26a and 26b are passing through apertures provided in the planar portion of the clamp base 22, each actuator screw is adapted to facilitate outward and inward movement of the push plates 28a and 28b with respect to the clamp base 22 as it rotates clockwise and anticlockwise respectively. More specifically, the clamp base 22 is provided with apertures disposed thereon for locating the actuator screws 26a and 26b, each of the screw is provided with a flange that acts as a retaining element. The actuator screws 26a and 26b, in this embodiment, are made from Stainless steel of grade SS304. However, the present invention is not limited to a particular method or material for configuring the actuator screws 26a and 26b.

The DIN rail clamp 20 further includes a pair of push plates 28a and 28b, wherein each of the push plates is threadably secured onto a corresponding actuator screw and is adapted to be either in a lifted configuration or a seated configuration based on movement of the corresponding actuator screw. In the seated configuration of the push plates 28a, 28b, the push plates 28a, 28b are mounted on the plain portion of the actuator screw. More specifically, in the seated configuration of the push plates, the actuator screw rotates freely. Such a free rotation of the actuator screw is an indication that the DIN rail clamp is in an open configuration. Further, such arrangement prevents over-torquing of the actuator screw, when the DIN rail clamp is in an open configuration. The push plates 28a and 28b, in this embodiment, are made from Stainless steel of grade SS304/SS316. However, the present invention is not limited to a particular method or material for configuring the push plates 28a and 28b. Each of the push plates is held by a corresponding pair of slot provided at the opposite side walls of the clamp base 22.

The DIN rail clamp 20 further includes a pair of clamping hooks 24a and 24b hingeably supported between the side walls of the clamp base 22, wherein each clamping hook includes a first end supported by a corresponding push plate and a second end adapted to move between an engaged configuration in which the second end engages with either of the co-planar flanges 42a, 42b of the DIN rail 40 for facilitating clamping of the DIN rail 40 by the clamping hooks 24a and 24b and a disengaged configuration in which the second end of the clamping hook is adapted to disengage from either of the co-planar flanges 42a, 42b of said DIN rail 40. The second end of each of the clamping hooks 24a and 24b is provided with gripping jaws for facilitating tight gripping of the co-planar flanges 42a, 42b of the DIN rail 40 by the clamping hooks 24a and 24b. More specifically, as the actuating screw 26a is rotated clockwise, the push plate 28a on the actuating screw 26a advances outwardly of the clamp base 22, causing the push plate 28a to attain a lifted configuration, in the lifted configuration, the push plate 28a causes the second end of the clamping hook 24a to engage with the flange 42a of the DIN rail 40. The clamping hooks 24a and 24b, in this embodiment, are made from stainless steel of grade CR steel EN42. However, the present invention is not limited to a particular method or material for configuring the clamping hooks 24a and 24b.

The DIN rail clamp 20 further includes a pair of springs 34a and 34b, wherein each spring is supported between the side walls of the clamp base 22 by a corresponding spring pin 29a or 29b, and is adapted to urge a corresponding clamping hook to a disengaged/open configuration when a corresponding push plate is in the seated configuration. Further, in the seated configuration of the push plates, the push plates are mounted on the plain portion of the actuator screw and the actuator screw rotates freely. The DIN rail clamp 20 further includes a pair of spacers that are mounted on the spring pin to maintain the spring in operational configuration. For example, the spring 34a is adapted to urge the clamping hook 24a to a disengaged/open configuration when push plate 28a is in the seated configuration. The springs 34a and 34b, in this embodiment, are made from stainless steel of grade SS304. However, the present invention is not limited to a particular method or material for configuring the springs 34a and 34b.

Figure 3:
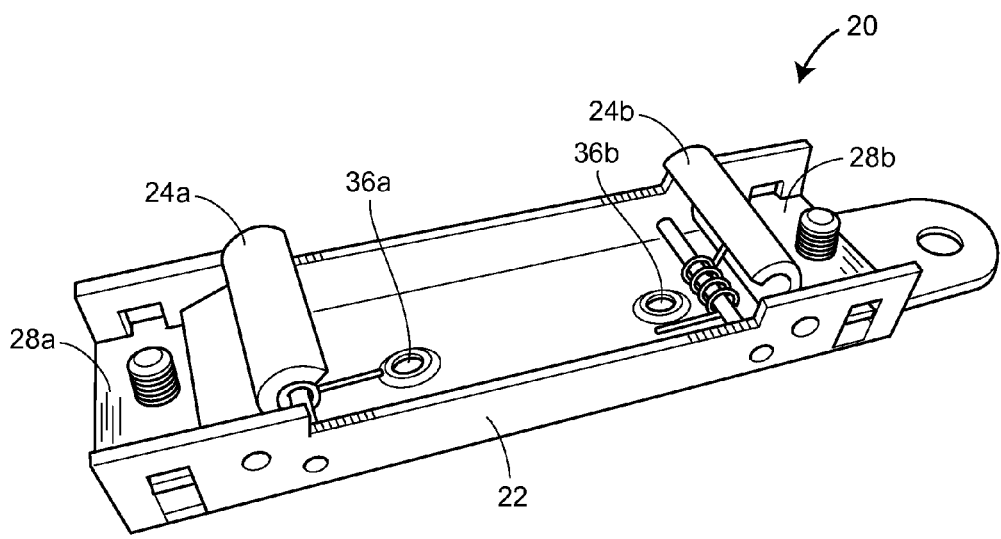

FIG. 3 of the accompanying drawings illustrate another view of the DIN rail clamp 20. The clamp base 22 of the DIN rail clamp 20 may include a plurality of apertures 36a and 36b for facilitating affixing the DIN rail clamp 20 to the base module.

Figure 4:
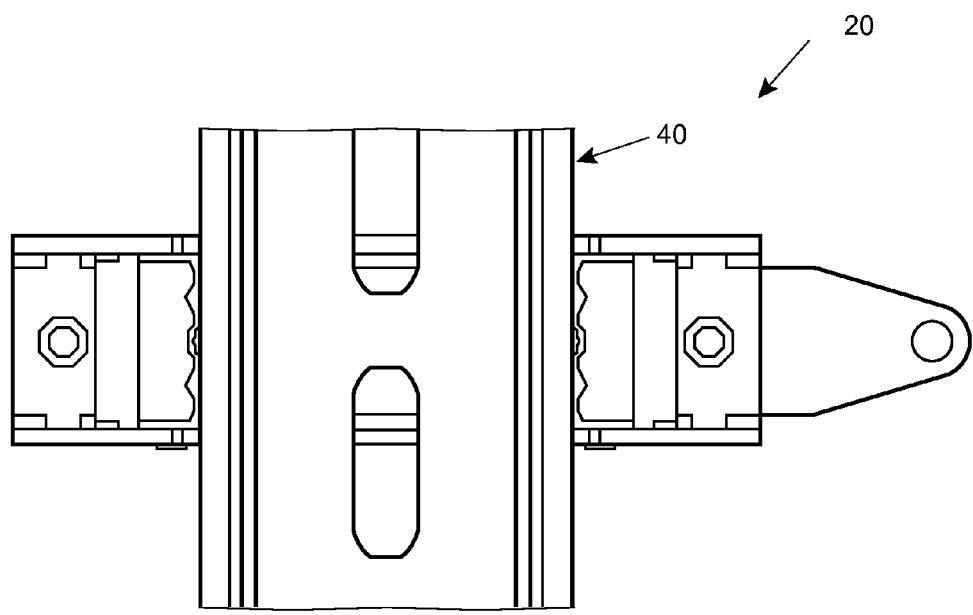

FIG. 4 of the accompanying drawings illustrates a top view of the DIN rail clamp 20 of FIG. 2 aligned with respect to a DIN rail 40, wherein the DIN rail clamp 20 is in an open configuration, i.e., the clamping hooks 24a and 24b of the DIN rail clamp 20 are disengaged from the co-planar flanges 42a, 42b of the DIN rail 40.

Figure 5:
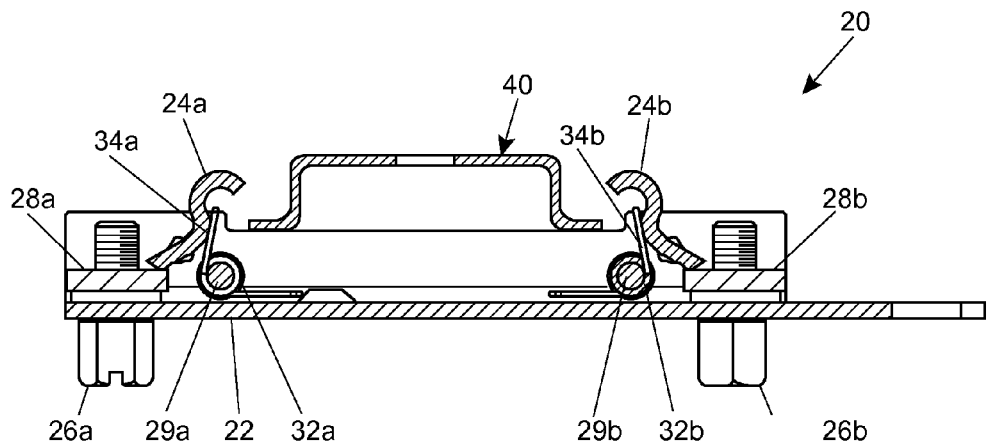

FIG. 5 of the accompanying drawings illustrates another view of the DIN rail clamp of FIG. 2 in an open configuration. More particularly, the push plates 28a and 28b are in a seated configuration, where in such a configuration of the push plates 28a and 28b, the springs 34a and 34b are urging the clamping hooks 24a and 24b to remain disengaged from the flanges 42a and 42b of the DIN rail 40. More specifically, in the seated configuration of the push plates 28a and 28b, the push plates 28a and 28b are mounted on the plain portion of the actuator screws 26a and 26b respectively and accordingly, the actuator screws can rotate freely.

Figure 6A:
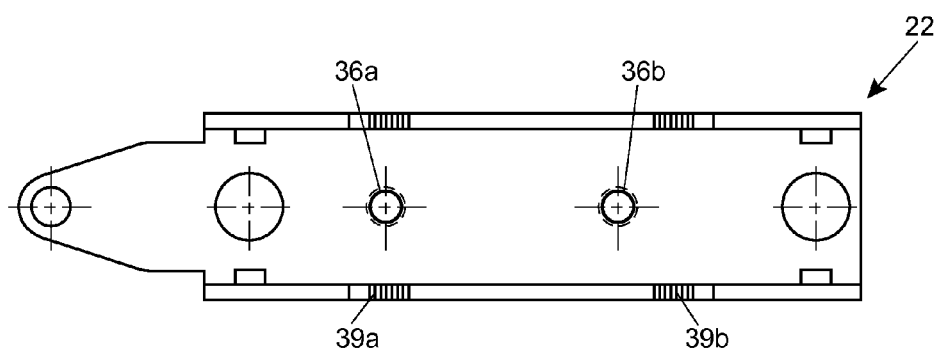
FIG. 6(a) illustrates a top view of the clamp base of the DIN rail clamp of FIG. 2.
Figure 6B:
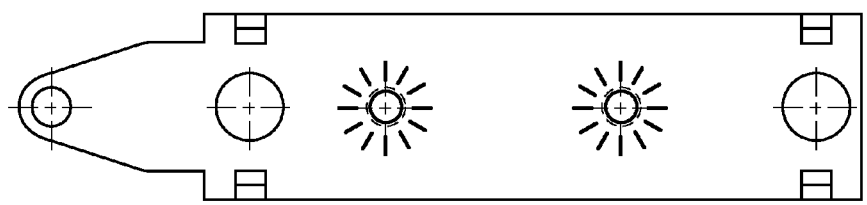
FIG. 6(b) illustrates a bottom view of the clamp base of DIN FIG. 6(a)
Figure 6C:
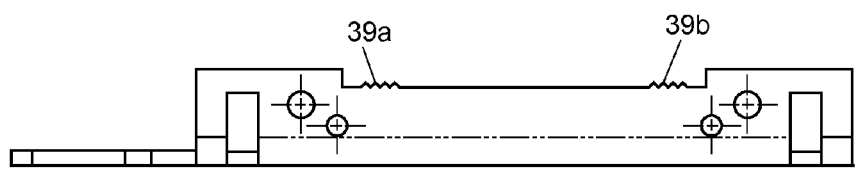
FIG. 6(c) illustrates a side view of the clamp base of FIG. 6(a)
Figure 6D:
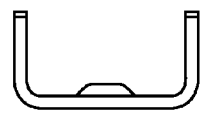
FIG. 6(d) illustrates a front view of the clamp base of FIG. 6(a)
Figure 6E:
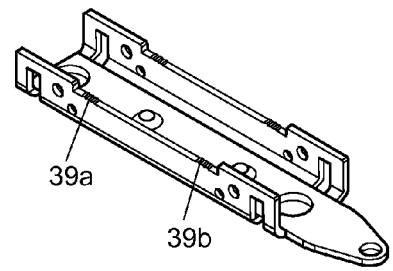
FIG. 6(e) illustrates an isometric view of the clamp base of FIG. 6(a)

FIG. 6(a)-FIG. 6(e) of the accompanying drawings illustrates the different views of the clamp base 22 of the DIN rail clamp 20. The apertures 36a and 36b are provided on the base plate 22 for affixing the DIN rail clamp 20 to the base module, the apertures 36a and 36b are illustrated in FIG. 6(a) and FIG. 6(b). Further, as illustrated in FIG. 6(a), FIG. 6(c) and FIG. 6(e) serrations 39a and 39b are provided on the top edge of both the side walls of the clamp base 22, these serrations indent into DIN rail flange for facilitating better electrical contact.

Figure 9A:
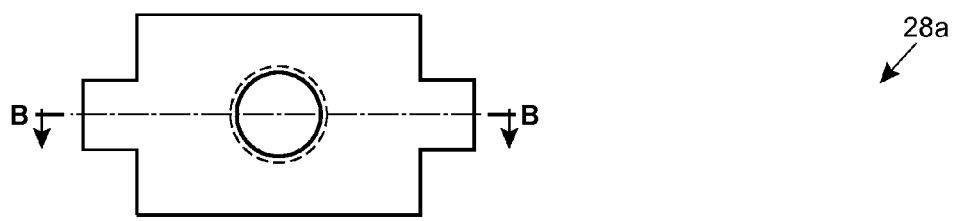
FIG. 9(a) illustrates a top view of a push plate of the DIN rail clamp of FIG. 2.
Figure 9B:
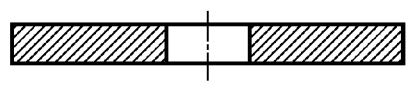
FIG. 9(b) illustrates a sectional view of the push plate along a section line B-B illustrated in FIG. 9(a)
Figure 9C:
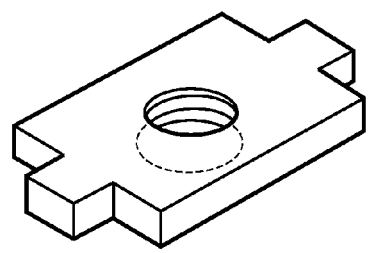
FIG. 9(c) illustrates an isometric view of the push plate of FIG. 9(a)
Figure 10A:
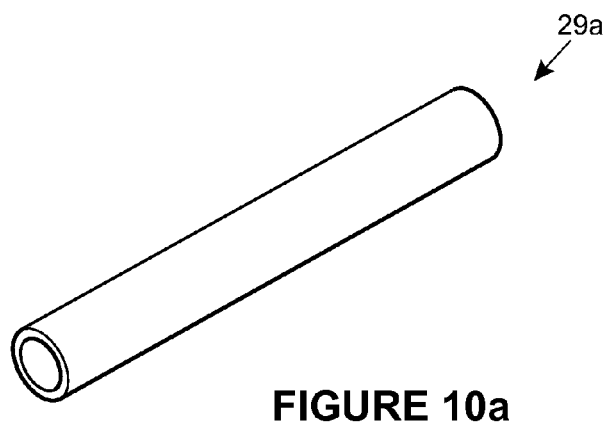
FIG. 10(a) illustrates an isometric view of the spring pin of a DIN rail clamp of FIG. 2.

FIG. 7(a)-FIG. 7(e) illustrate various views of the clamping hook 24a. As is illustrated in FIG. 7(e) the griping edge of the clamping hook 24a is provided with jaws in order to facilitate gripping of the flanges 42a and 42b of the DIN rail 40. The construction and working of the clamping hook 24b is similar to the construction and working of the clamping hook 24a. Further, FIG. 8(a)-FIG. 8(d) illustrate the various view the actuation screw 26a, wherein the threaded portion 38a of the actuating screw 26a is adapted to engage with the threaded hole on the push plate 28a and move the push plate 28a inward or outward of the clamp base 22 of the DIN rail clamp 20. Further, FIG. 9(a)-FIG. 9(c) illustrate the various view the push plates 28a. The push plate 28a is provided with a threaded hole that engages with the threaded portion 38a of the actuating screw 26a. Similarly, FIG. 10(a)-FIG. 10(c) illustrates the various view of the spring pin 29a. The push plates 28a, in this embodiment, are made from stainless steel of grade SS304/316. However, the present invention is not limited to a particular method or material for configuring the push plates 28a. The spring pin 29a, in this embodiment, is made from stainless steel of grade SS304. However, the present invention is not limited to a particular method or material for configuring the spring pin 29a.

Figure 12A:
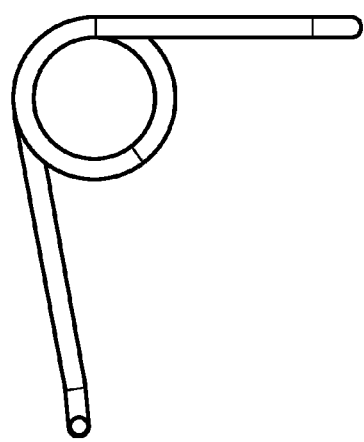
FIG. 12(a) illustrates a top view of a spring of the DIN rail clamp of FIG. 2.
Figure 12B:
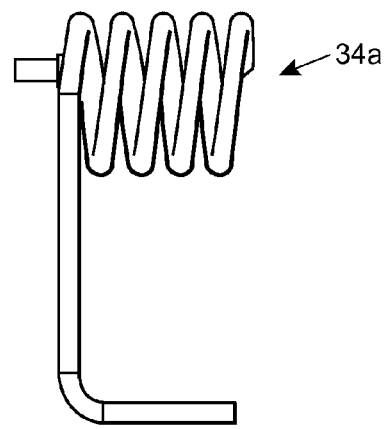
FIG. 12(b) illustrates a side view of the spring of FIG. 12(a)
Figure 12C:
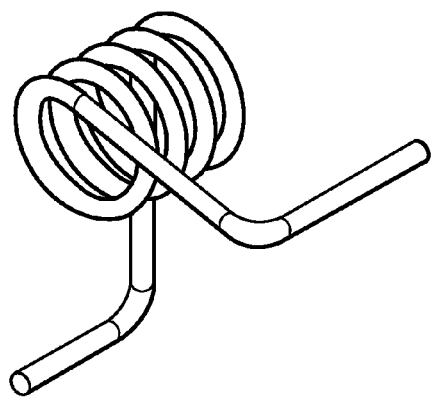
FIG. 12(c) illustrates an isometric view of the spring of FIG. 12(a)
Figure 13A:
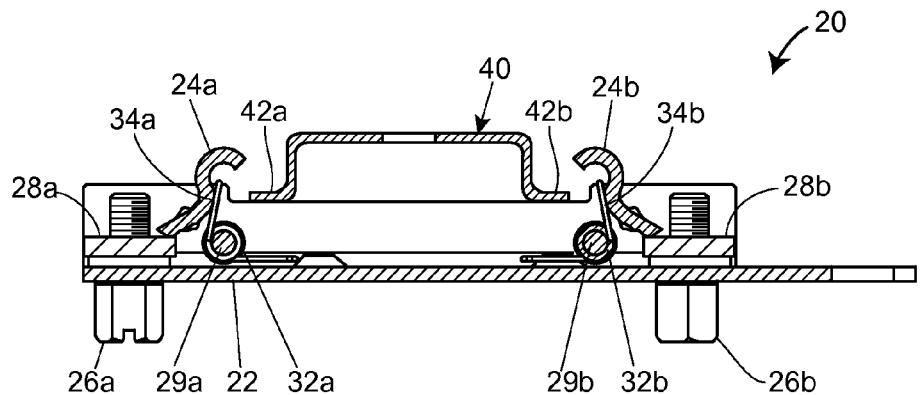
FIG. 13(a) illustrates a schematic representation of the DIN rail clamp of FIG. 2 in an open configuration, wherein the clamping hooks of the DIN rail clamp are disengaged from the DIN rail.
Figure 13B:
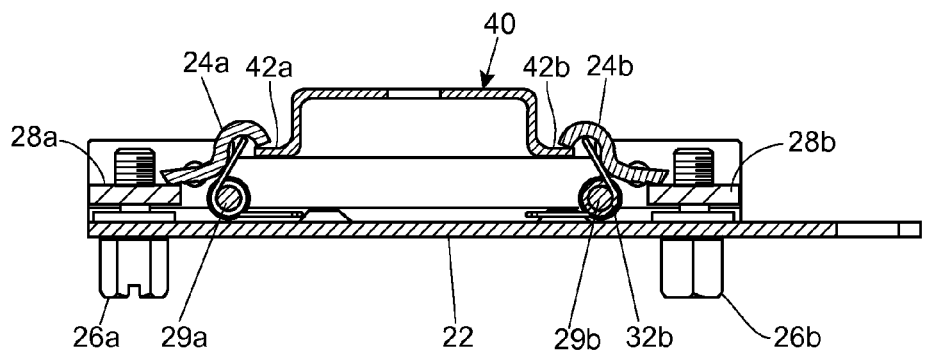
FIG. 13(b) illustrates a schematic representation of the DIN rail clamp of FIG. 2 in a closed configuration, wherein the clamping hooks of the DIN rail clamp are engaging the DIN rail.
Figure 13C:
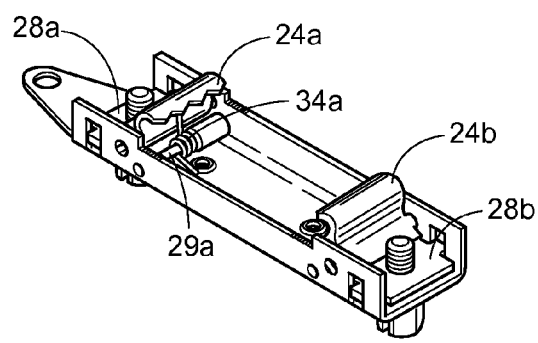
FIG. 13(c) illustrates an isometric view of the DIN rail clamp of FIG. 2.
Figure 16A:
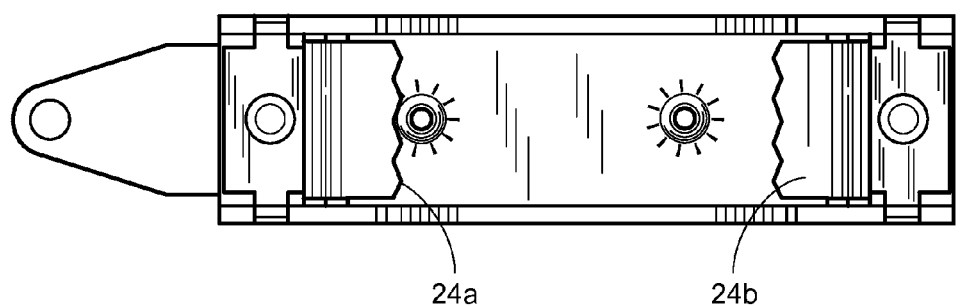
FIG. 16(a) illustrates a top view of the DIN rail clamp of FIG. 2.
Figure 16B:
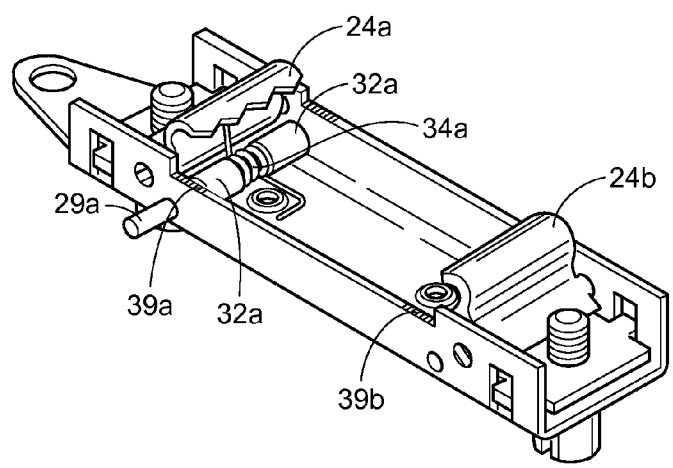
FIG. 16(b) illustrates an isometric view of the DIN rail clamp of FIG. 2.

The spring pin 29b is similar in construction to the spring pin 29a. Furthermore, FIG. 11(a)-FIG. 11(c) illustrates the various views of the spacer 32a. At least one spacer is mounted on the spring pin 29a to maintain the spring 34a in an operational configuration. FIG. 13(c) illustrates a single spacer mounted on the spring pin 29a. In accordance with another embodiment of the present invention, a pair of spacers is mounted on the spring pin 29a as illustrated in FIG. 16(b) of the accompanying drawings. More specifically, the pair of spacers restrains the axial movement of the spring 34a along the spring pin 29a. The spacer 32a, in this embodiment, is made from stainless steel of grade SS304. However, the present invention is not limited to a particular method or material for configuring the spacer 32a. The spacer 32b is similar in construction to the spacer 32a. Furthermore, FIG. 12(a)-FIG. 12(c) illustrates the various views of the spring 34a. FIG. 13(a) of the accompanying drawings illustrates a schematic representation of the DIN rail clamp 20 of FIG. 2 in an open configuration, wherein the clamping hooks 24a and 24b of the DIN rail clamp 20 are disengaged from the flanges 42a and 42b respectively of the DIN rail 40. In the open configuration of the DIN rail clamp 20 the support plates 28a and 28b are mounted on the plain portion 37a and 37b of the actuator screws 26a and 26b. Similarly, FIG. 13(b) of the accompanying drawings illustrates a schematic representation of the DIN rail clamp 20 of FIG. 2 in a closed configuration, wherein support plates 28a and 28b are mounted on the threaded portion 38a and 38b of the actuator screws 26a and 26b and the clamping hooks 24a and 24b of the DIN rail clamp 20 are engaging the flanges 42a and 42b respectively of the DIN rail 40. FIG. 13(c) of the accompanying drawings illustrates an isometric view of the DIN rail clamp 20 with the spring pin 29a and a single spacer mounted on the spring pin 29a.

Figure 14A:
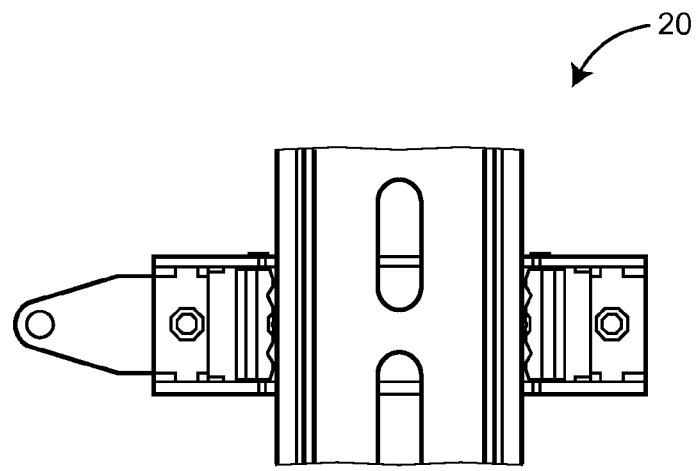
FIG. 14(a) illustrates another view of the DIN rail clamp.
Figure 14B:
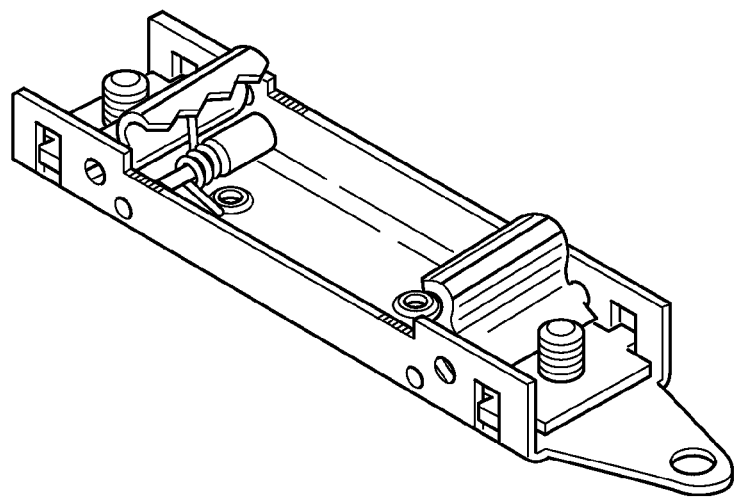
FIG. 14(b) illustrates still another view of the DIN rail clamp.
Figure 15A:
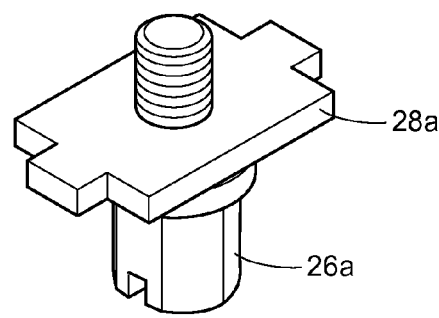
FIG. 15(a) illustrates an actuator screw and push plate assembly.
Figure 15B:
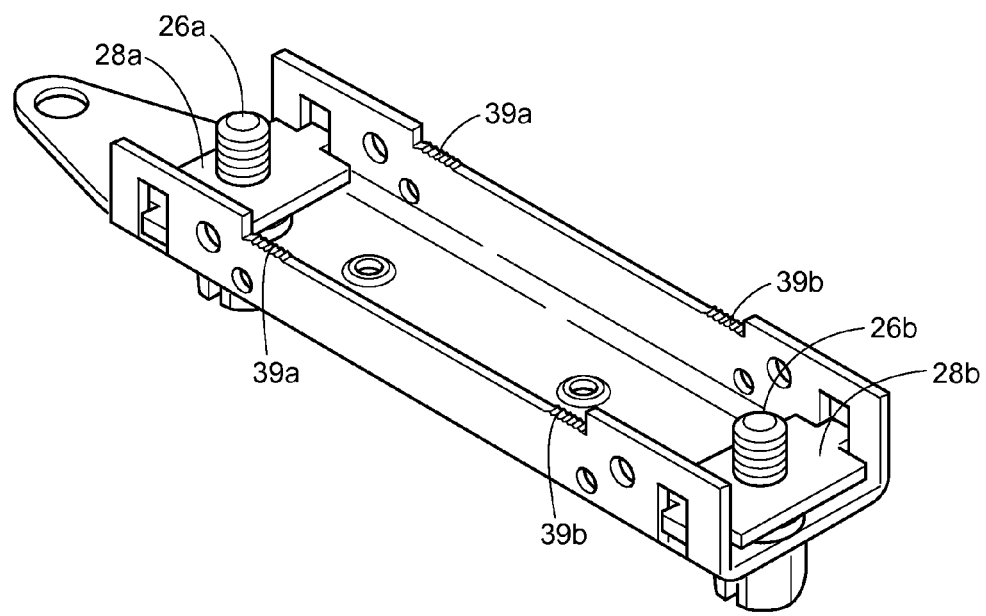
FIG. 15(b) illustrates a pair of push plates mounted on the clamp base of the DIN rail clamp of FIG. 2 by means of pair of actuator screws.

FIG. 14(a) and FIG. 14(b) of the accompanying drawings illustrate different views of the DIN rail clamp 20. FIG. 15(a) and FIG. 15(b) illustrate assembling of the DIN rail clamp 20, more particularly, FIG. 15(a) of the accompanying drawings illustrates an actuator screw 26a and push plate 28a assembly. Further, FIG. 15(b) of the accompanying drawings illustrates actuator screw-push plate assembly mounted on the clamp base 22 of the DIN rail clamp 20. More particularly, the push plates 28a and 28b are provided with projections referred to as clamp bars that fit into clamp base grooves provided on side walls of the clamp base 22. FIG. 16(a) illustrates a top view of the DIN rail clamp 20 and FIG. 16(b) illustrates assembly of the spring 34a and a pair of spacers 32a mounted onto the spring pin 29a. More specifically, the spring 34a mounted on the spring pin 29a is sandwiched between a pair of spacers that inhibit the axial movement of the spring 34a, thereby maintaining the spring 34a in an operative configuration thereof.

Figure 17:
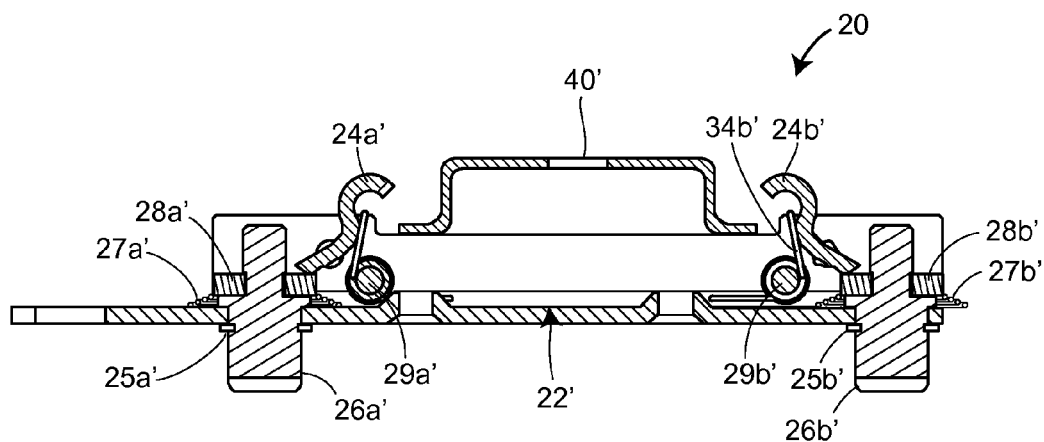
FIG. 17 illustrates a DIN rail clamp in accordance with another embodiment of the present invention.

FIG. 17 of the accompanying drawings illustrates a view of the DIN rail clamp 20' in accordance with another embodiment of the present invention. Referring to FIG. 17 of the accompanying drawings, the DIN rail clamp 20' is illustrated in an open configuration. The DIN rail clamp 20' is adapted to secure DIN rail terminal blocks to a DIN rail 40'. The DIN rail clamp 20' includes a clamp base 22', a pair of clamping hooks 24a' and 24b', a pair of push plates 28a' and 28b', a pair of spring pins 29a' and 29b', a pair of spacers 32a' and 32b' (not illustrated in FIG. 17) and a pair of springs 34a' (not illustrated in FIG. 17) and 34b'. All these elements of the DIN rail clamp 20' are similar to the pair of clamping hooks 24a and 24b, a pair of push plates 28a and 28b, a pair of spring pins 29a and 29b, a pair of spacers 32a and 32b and a pair of springs 34a and 34b respectively of the DIN rail clamp 20 illustrated in FIG. 2-FIG. 5. Accordingly, for the sake of brevity of the present documents, these elements are not described in detail. However, the DIN rail clamp 20' further includes a pair of actuator screws 26a' and 26b' that are of a configuration different from the actuator screws 26a and 26b of the DIN rail clamp 20. The DIN rail clamp 20' includes additional elements such as a pair of sir-clips 25a' and 25b' and a pair of conical springs 27a' and 27b'. More specifically, each of the actuator screws 26a' and 26b' of the DIN rail clamp 20' includes a slot "S" configured thereon for accommodating a respective sir-clip. The conical springs 27a' disposed between the push plate 28a' and the clamp base 22' is adapted to maintain the push plate 28a' in contact with the actuator screw 26a' and also facilitates in smooth engagement of the actuator screw 26a'. Similarly, the conical springs 27b' disposed between the push plate 28b' and the clamp base 22' is adapted to maintain the push plate 28b' in contact with the actuator screw 26b' and also facilitates in smooth engagement of the actuator screw 26b'. Furthermore, the conical springs 27a' and 27b' are positioned so as to apply pressure on the respective push plates 28a' and 28b' from bottom side thereof. Further, the conical springs 27a' and 27b' requires less space in compressed state thereof. Such a configuration of the conical springs 27a' and 27b' facilitates in maintaining the push plates 28a' and 28b' in contact with respective last thread of the actuator screws 26a'and 26b'.

Further, the sir-clips 25a' and 25b' accommodated in the slot provided on the actuator screws 26a'and 26b' respectively are adapted to maintain the position of the actuator screws 26a'and 26b' even under the conical spring tension. The sir-clips 25a' and 25b' maintains the actuator screws 26a'and 26b' straight, thereby facilitating smooth up and down movement of the push plates in the slots provided there-for.

Figure 18:
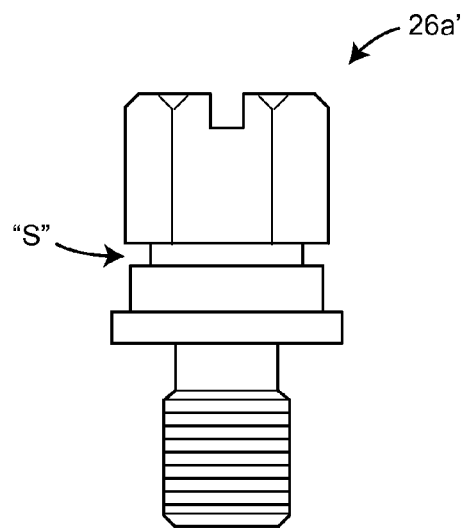
FIG. 18 illustrates an actuator screw of the DIN rail clamp of FIG. 17.

FIG. 18 of the accompanying drawings illustrates the actuator screw 26a' used in the DIN rail clamp 20'. Further, as illustrated in FIG. 18, the actuator screw 26a' of the DIN rail clamp 20' includes a slot "S" configured thereon for accommodating the sir-clip 25a'.

FIG. 19(a) and FIG. 19(b) of the accompanying drawings illustrate different views of the sir-clip 25a' of the DIN rail clamp 20'. More specifically, FIG. 19(a) illustrates an isometric view of the sir-clip 25a' and FIG. 19(b) illustrates top view of the sir-clip 25a'.

FIG. 20(a) of the accompanying drawings illustrates an isometric view of the conical spring 27a' of the DIN rail clamp 20', in an un-compressed state. Further, FIG. 20(b) illustrates the conical spring 27a' of the DIN rail clamp 20', in a compressed state.

Figure 21A:
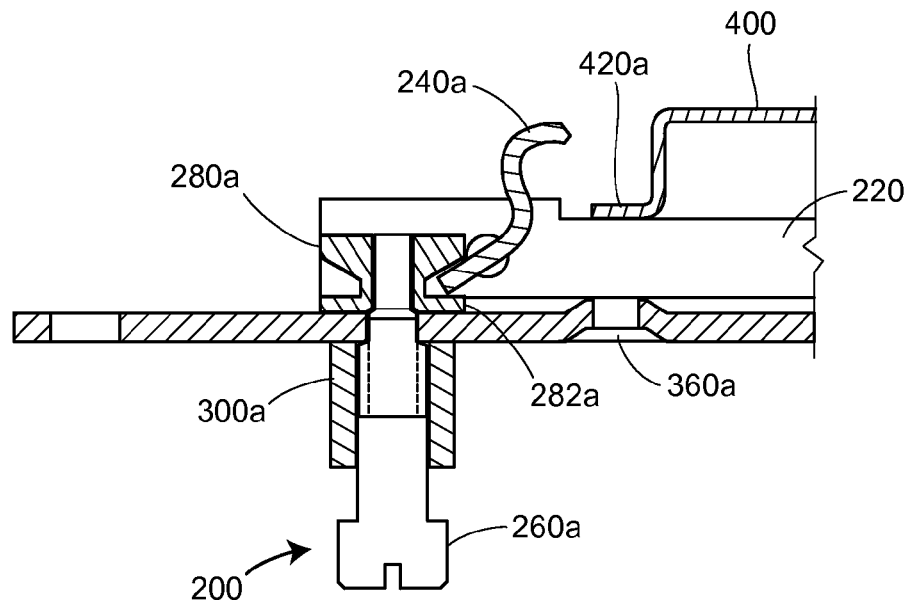
FIG. 21(a) illustrates a schematic representation of a DIN rail clamp in accordance with still another embodiment of the present invention.
Figure 21B:
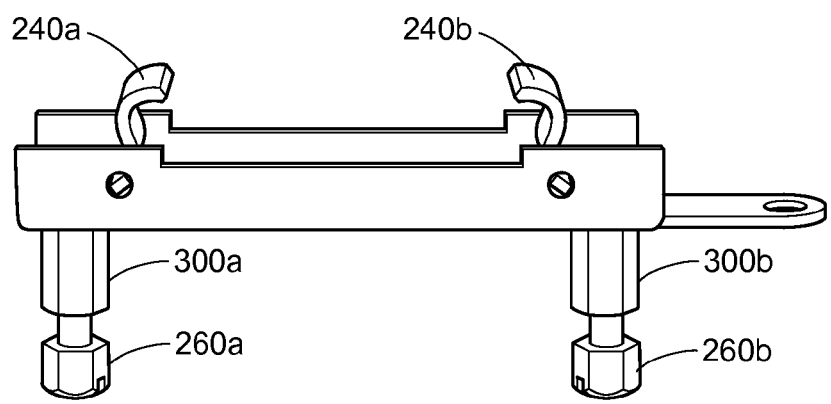
FIG. 21(b) illustrates a schematic representation of the DIN rail clamp of FIG. 17(a)

FIG. 21(a) of the accompanying drawings illustrates a DIN rail clamp 200 in accordance with another embodiment of the present invention, wherein the push plate 280a is modified and provided with a cavity 282a that is adapted to facilitate positive engagement between the clamping hook 240a and the push plate 280a. More specifically, the cavity 282a configured on the push plate 280a is adapted to receive the first end of the clamping hook 240a. Furthermore, the DIN rail clamp 200 includes a sleeve/bush for enveloping the actuator screw 260a, thereby preventing any damage to the actuator screw 260a. The sleeve or bush may be welded to a bottom portion of the clamp base 220 and has internal threads for receiving the treaded actuator screws. In the disengaged configuration of the clamping hook 240a, the push plate 280a is in a seated configuration, and the spring is maintaining the clamping hook 240a in a disengaged configuration wherein the clamping hook is disengaged from the flange 420a of the DIN rail 400. The actuator screw 260a moves inside the clamp base 220 of the DIN rail clamp 200 as a result of rotation thereof, thereby lifting the push plate 280a to a lifted configuration wherein the push plate 280a urges the clamping hook 240a into engagement with the flange 420a of the DIN rail 400. FIG. 21(b) of the accompanying drawings illustrates a schematic representation of the DIN rail clamp 200.

Figure 22A:
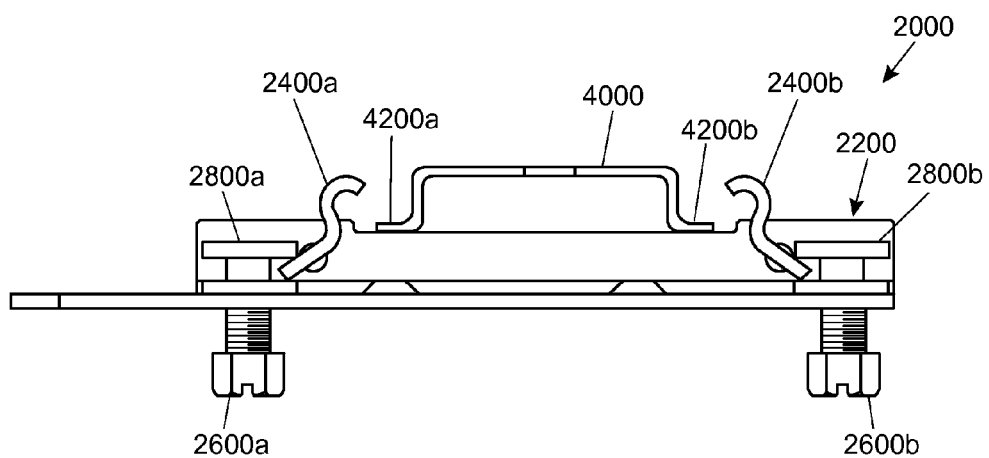
FIG. 22(a) illustrates a schematic representation of a DIN rail clamp in accordance with still another embodiment of the present invention, in an open configuration.
Figure 22B:
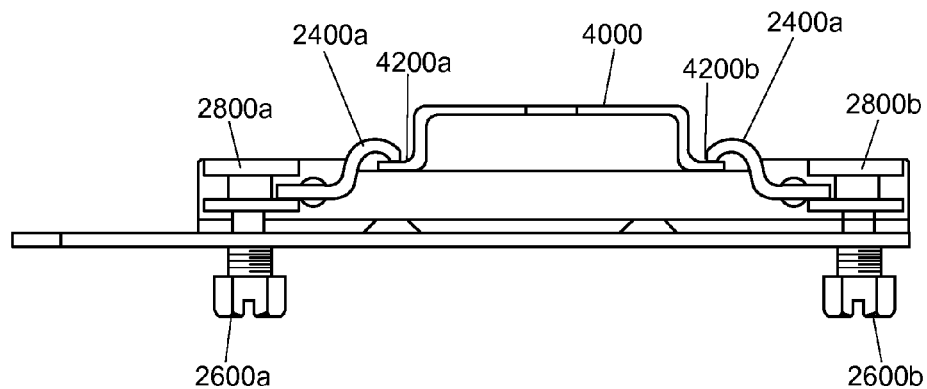
FIG. 22(b) illustrates the DIN rail clamp of FIG. 22(a) in a closed configuration.

FIG. 22(a) and FIG. 22(b) of the accompanying drawings illustrates a schematic representation of the DIN rail clamp 2000 in an open configuration and closed configuration respectively in accordance with a still another embodiment of the present invention. In accordance with this embodiment, the first end of the clamping hook is held between the top and bottom flange of the push plates. More specifically, the first end of the clamping hook 2400a is held between the top and bottom flange of the push plate 2800a. The various elements of the DIN rail clamp 2000 are similar to the DIN rail clamp 20 and DIN rail clamp 200.

FIG. 23(a) and FIG. 23(b) illustrates the DIN rail clamp 3000 in accordance with still another embodiment of the present invention. More specifically, FIG. 23(a) illustrates an assembled view of the DIN rail clamp 3000 whereas the FIG. 23(b) illustrates an exploded view of the DIN rail clamp 3000. The DIN rail clamp 3000 includes a pair of clamps 3400 that are assembled to the clamp base 3200 by means of screws 3600a and 3600b, each of the screws include a retaining ring disposed at a distal end thereof.

FIG. 24 of the accompanying drawings illustrates a DIN rail clamp in accordance with still another embodiment of the present invention. More specifically, the FIG. 24 of the accompanying drawings illustrates the DIN rail clamp in an open configuration. The configuration and working of the DIN rail clamp illustrated in FIG. 24 is similar to the configuration and working of the DIN rail clamps disclosed in the previous embodiments. Accordingly, for the sake of brevity of the present document, the various elements of the DIN rail clamp illustrated in FIG. 24 are not described in details.

Figure 25A:
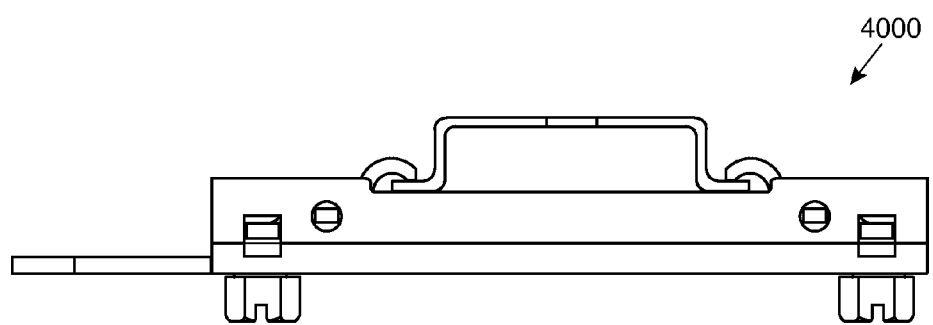
FIG. 25(a) illustrates a schematic representation of a DIN rail clamp in accordance with still another embodiment of the present invention, in a closed configuration.
Figure 25B:
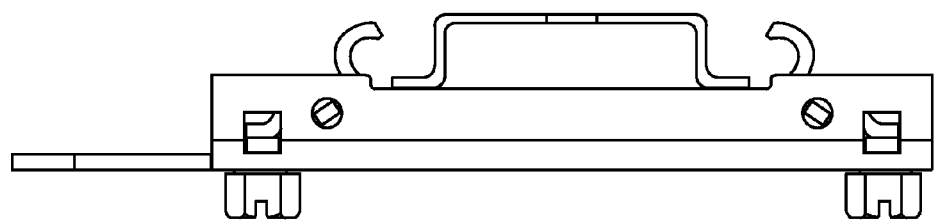
FIG. 25(b) illustrates the DIN rail clamp of FIG. 21(a) in an open configuration.
Figure 26:
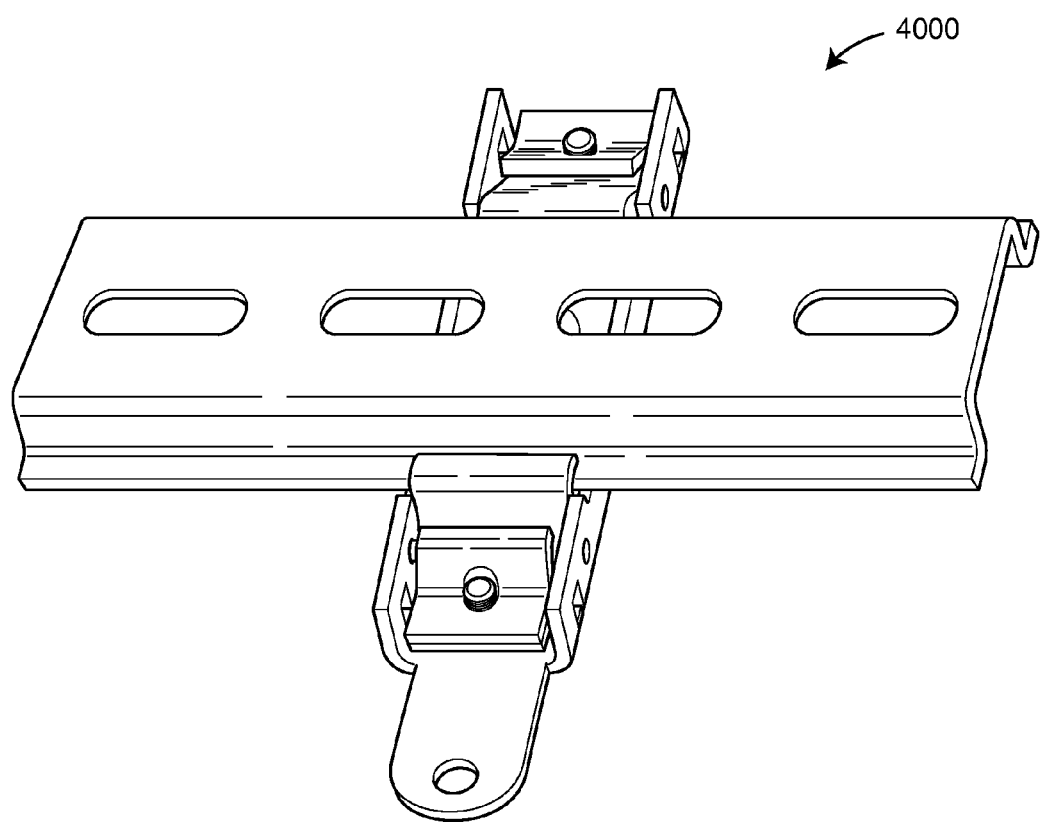
FIG. 26 illustrates an isometric view of the DIN rail clamp of FIG. 25(a)
Figure 27A:
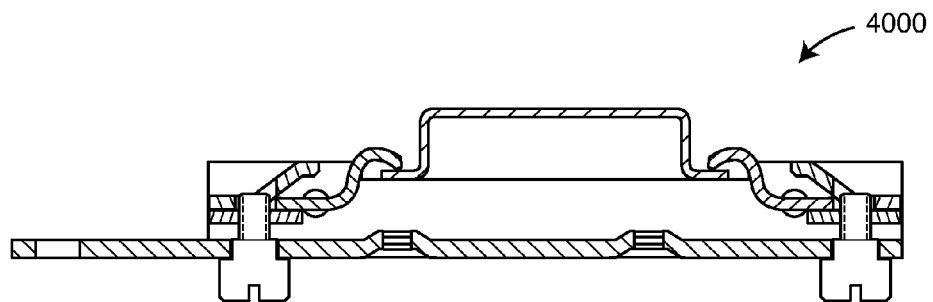
FIG. 27(a) illustrates a close view of the DIN rail clamp of FIG. 25(a) in a closed configuration.
Figure 27B:
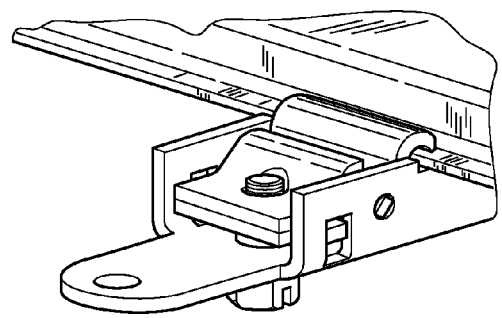
FIG. 27(b) illustrates another isometric view of the DIN rail clamp of FIG. 25(a)
Figure 27C:
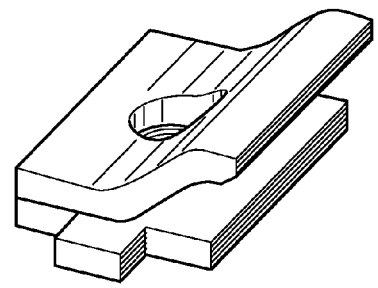
FIG. 27(c) illustrates an enlarged view a modified push plate of the DIN rail clamp of FIG. 25(a)

FIG. 25(a) and FIG. 25(b) of the accompanying drawings illustrates a schematic representation of the DIN rail clamp 4000 in a closed configuration and open configuration respectively in accordance with a still another embodiment of the present invention. FIG. 26 of the accompanying drawings illustrates an isometric view of the DIN rail clamp 4000. FIG. 27(a) and FIG. 27(b) illustrate different views of the DIN rail clamp 4000. FIG. 27(c) illustrates an enlarged view of a modified push plate of the DIN rail clamp 4000.

Figure 28A:
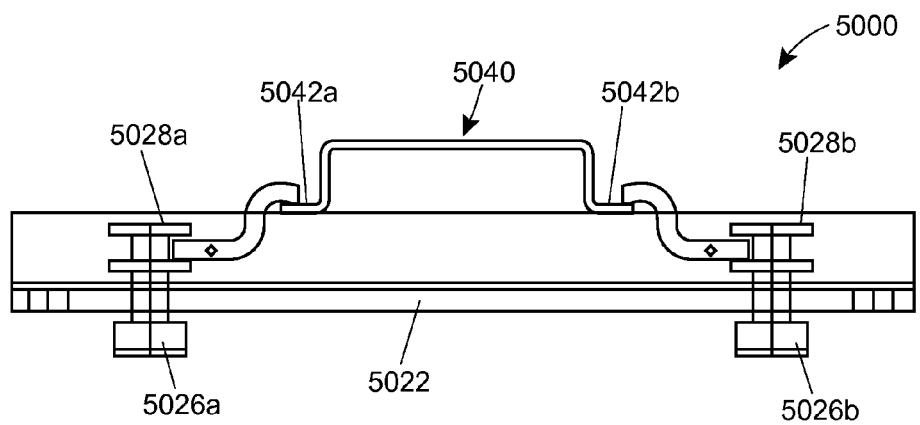
FIG. 28(a) illustrates a schematic representation of the DIN rail clamp in accordance with still another embodiment of the present invention, in a closed configuration.
Figure 28B:
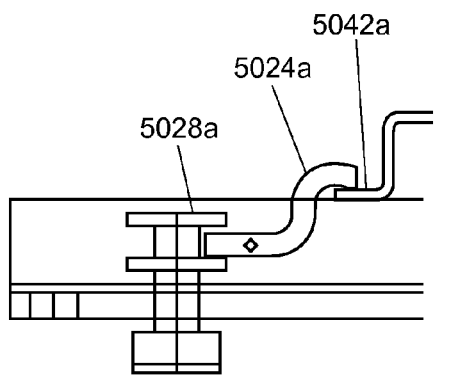
FIG. 28(b) illustrates a close view of the DIN rail clamp of FIG. 28(a) in closed configuration.
Figure 28C:
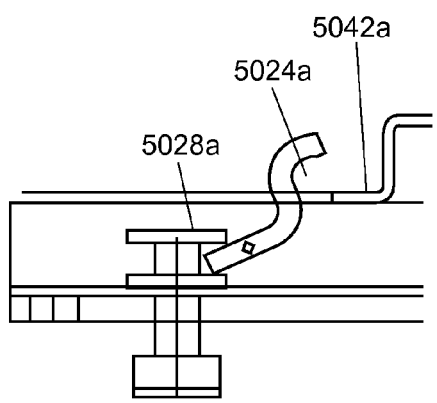
FIG. 28(c) illustrates a close view of the DIN rail clamp of FIG. 28(a) in an open configuration.

FIG. 28(a) of the accompanying drawings illustrates a schematic representation of a DIN rail clamp 5000 in accordance with still another embodiment of the present invention. FIG. 28(b) and FIG. 28(c) illustrate close views of the DIN rail clamp 5000 in close and open configuration respectively. The DIN rail clamp 5000 includes a clamp base 5022, a pair of clamping hooks 5024a and 5024b, a pair of actuator screws 5026a and 5026b, a pair of push plates 5028a and 5028b, wherein each of the push plate includes a pair of flanges radially extending outwardly there-from.

Figure 29:
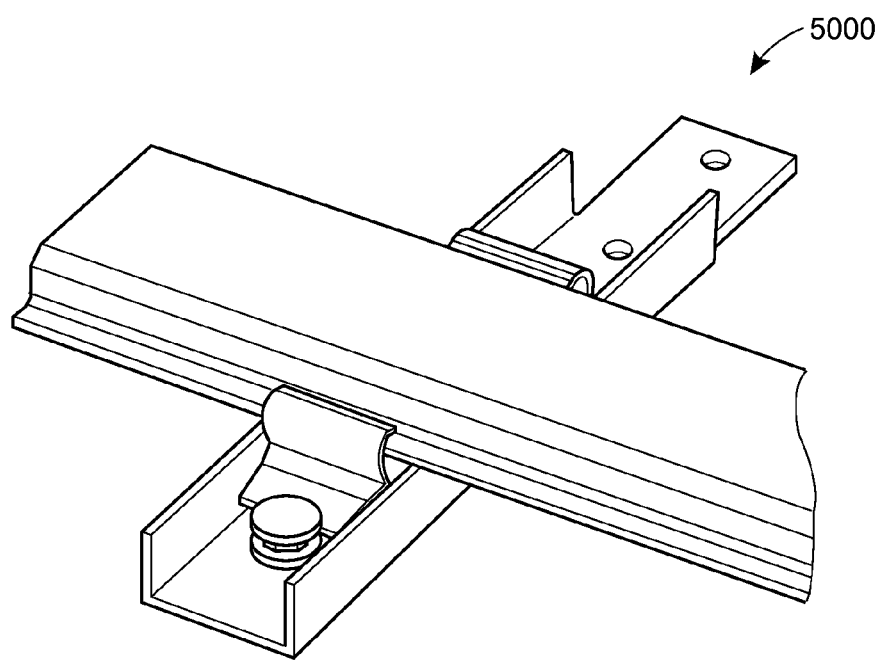
FIG. 29 illustrates an isometric view of the DIN rail clamp of FIG. 28(a)

Although configuration and working of most of the components of the DIN rail clamp 5000 are similar to the configuration and working of the components of the DIN rail clamps of the previously discussed embodiments, the clamping mechanism of the DIN rail clamp 5000 is different. More particularly, the clamping hooks 5024a and 5024b of the DIN rail clamp 5000 includes a first end and a second end, wherein the first end of each of the clamping hooks is held between the flanges of a corresponding push plate, whereas the second end of the clamping hook engages with a corresponding flange of the DIN rail 5040 in case of closed configuration of the DIN rail clamp 5000 and remains disengaged from a corresponding flange of the DIN rail 5040 in case of an open configuration of the DIN rail clamp 5000. However, in accordance with this embodiment of the present invention, the actuator screw 5026a remains inside the clamp base 5022 of the DIN rail clamp 5000, the push plate 5028a secured to the distal end of the actuator screw 5026a is maintained in a lifted configuration in which the clamping hook 5024a remains engaged with the flange 5042a of the DIN rail 5040, thereby defining the closed configuration of the DIN rail clamp 5000. FIG. 28(*b*) of the accompanying drawings illustrates the closed configuration of the DIN rail clamp 5000. As the actuator screw 5026a moves out of the clamp base 5022 of the DIN rail clamp 5000, the push plate 5028a secured to the distal end of the actuator screw 5026a achieves a seated configuration and the clamping hook 5024a disengages from the flange 5042a of the DIN rail 5040, thereby defining the open configuration of the DIN rail clamp 5000. FIG. 28(*c*) of the accompanying drawings illustrates the open configuration of the DIN rail clamp 5000. FIG. 29 illustrates an isometric view of the DIN rail clamp 5000.

Figure 30A:
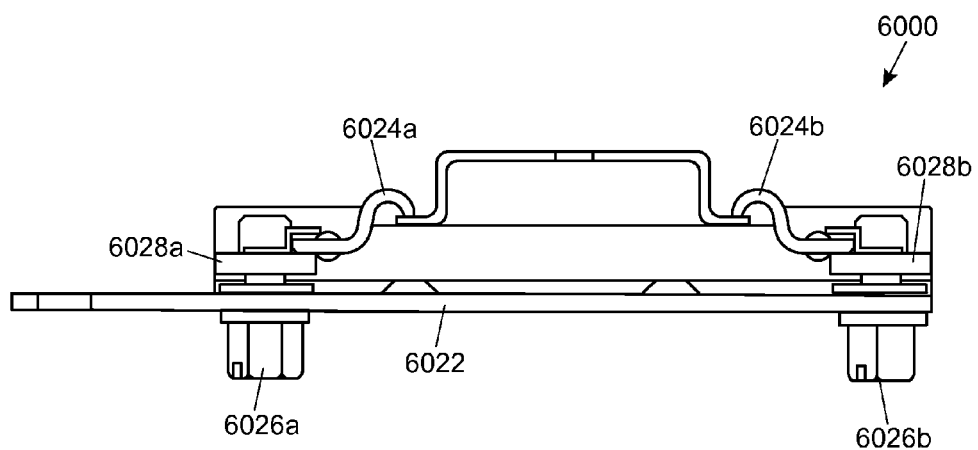
FIG. 30(a) illustrates a schematic representation of the DIN rail clamp in accordance with yet another embodiment of the present invention, in a closed configuration.
Figure 30B:
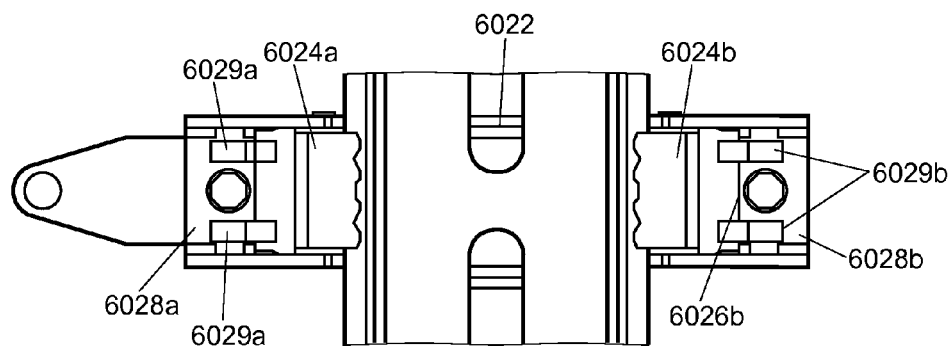
FIG. 30(b) illustrates a top view of the DIN rail clamp of FIG. 30(a), wherein the clamping hooks of the DIN rail clamp are engaging the DIN rail.

FIG. 30(*a*) of the accompanying drawings illustrates a schematic representation of a DIN rail clamp 6000 in accordance with still another embodiment of the present invention. More specifically, FIG. 30(*a*) and FIG. 30(*b*) illustrate different views of the DIN rail clamp 6000 in closed configuration. The DIN rail clamp 6000 includes a clamp base 6022, a pair of clamping hooks 6024a and 6024b, a pair of actuator screws 6026a and 6026b, a pair of push plates 6028a and 6028b, wherein each of the push plate includes a pair of flanges radially extending outwardly there-from. The push plate 6028a of the DIN rail clamp 6000 includes a pair of brackets 6029a secured thereto. Similarly, the push plate 6028b of the DIN rail clamp 6000 includes a pair of brackets 6029b secured thereto.

The pair of brackets 6029a secured to the push plate 6028a is adapted to restrain the vertical movement of the clamping hook 6024a and maintain the clamping hook 6024a in contact with the push plate 6028a. Similarly, the pair of brackets 6029b secured to the push plate 6028b is adapted to restrain the vertical movement of the clamping hook 6024b and maintain the clamping hook 6024b in contact with the push plate 6028b. More specifically, when the actuator screws are rotated clockwise or anticlockwise the corresponding push plates moves up or down respectively. As the push plates moves up or down the clamping hooks pivotally move between engaging and disengaging positions, apart from the pivotal movement the clamping hooks, the clamping hooks also move in other directions and such movement of the clamping hooks is required to be restrained. The movement of the clamping hooks along horizontal plane is restrained by the flanges of clamp base, whereas the movement of the clamping hooks along vertical plane is restrained by the pair of brackets.

FIG. 31 of the accompanying drawings illustrates a schematic representation of a DIN rail clamp 7000 in accordance with yet another embodiment of the present invention. More specifically, FIG. 31 illustrates the DIN rail clamp 7000 in an open configuration. The DIN rail clamp 7000 includes a clamp base 7022, a pair of clamping hooks 7024a and 7024b, a pair of actuator screws 7026a and 7026b and a pair of push plates 7028a and 7028b. The DIN rail clamp 7000 includes a pair of bushes 7029a and 7029b welded to the clamp base 7022. Each of the bushes 7029a and 7029b are internally threaded for facilitating insertion of the respective actuator screws 7026a and 7026b. On the top of each of the actuator screws 7026a and 7026b the respective spools or push plates 7028a and 7028b are mounted. As the actuator screws 7026a and 7026b are rotated clockwise and anticlockwise the DIN rail clamp 7000 opens and closes.

FIG. 32(*a*) and FIG. 32(*b*) of the accompanying drawings illustrates a schematic representation of a DIN rail clamp 8000 in accordance with still another embodiment of the present invention. More specifically, FIG. 32(*a*) illustrates the DIN rail clamp 8000 in an open configuration, whereas FIG. 32(*b*) illustrates the DIN rail clamp 8000 with an actuation screw thereof in a free rotating position after release. The DIN rail clamp 8000 includes a clamp base 8022, a pair of clamping hooks 8024a and 8024b, a pair of actuator screws 8026a and 8026b, a pair of buttons 8028a and 8028b, and a pair of bushes 8029a and 8029b. FIG. 33(*a*) illustrates a actuator screw 8026a used in the DIN rail clamp. FIG. 33(*b*) illustrates a button 8028a used in the DIN rail clamp 8000. The two bushes 8029a and 8029b are argon welded to the base plate 8022, the actuator screws 8026a and 8026b along with the two buttons 8028a and 8028b slide within the bushes 8029a and 8029b respectively. FIG. 33(*c*) illustrates a bush 8029a used in the DIN rail clamp 8000. During the assembly, the actuator screws 8026a and 8026b are inserted from top in the bushes 8029a and 8029b respectively and the assembly of the actuator screws 8026a and 8026b and the bushes 8029a and 8029b is welded to base plate as shown in FIG. 32a. Thereafter, the buttons 8028a and 8028b are inserted from the top as shown in FIG. 32a, wherein the buttons 8028a and 8028b will retain their position due to jaw pressure. So in the open position of the DIN rail clamp 8000, when the screws 8026a and 8026b are released from the bush thread, the screws 8026a and 8026b keep rotating freely. The screws 8026a and 8026b along with the buttons 8028a and 8028b transmit more torque to the clamping hooks 8024a and 8024b.

Test Set-Up, Measurement and Results

Experiments and tests were conducted to determine the effectiveness of the clamping device of the present invention. The clamping device was mounted on a DIN rail and tests were performed to determine the torque required for loosening or tightening the clamp. More specifically, the actuator screws were fastened in order to achieve the clamping of the DIN rail clamping device to the DIN rail. The results showed that the tightening torque required was in the range 5.87 N-m. The following table provides test reading conducted on the DIN rail Clamp and substantiates the above observation.

| Din Clamp Torque Test | | |
| --- | --- | --- |
| sr. no. | Lbf-in | Readings on gauge (N-m) |
| 1 | 50 lbf-in | 5.87 |
| 2 | 50 lbf-in | 5.87 |

Technical Advantages and Economical Significance

The clamping device in accordance with the present invention is adapted to provide a reliable connection between DIN rail terminal blocks and a DIN rail. The clamping device of the present invention assuredly clamps the DIN rail terminal blocks/connector to the DIN rail, while permitting intentional removal of the DIN rail terminal blocks/connector from the DIN rail. The clamping device prevents inadvertent disengagement of the DIN rail terminal blocks/connector from the DIN rail. Further, the clamping device is simple in construction. Furthermore, the clamping device requires less torque application for loosening or tightening the clamp. Still further, the clamping device is easy to manufacture. Further, the clamping device facilitates easy engagement and disengagement of the DIN rail terminal blocks from the DIN rail. Still further, the clamping device facilitates quick engagement and disengagement of the DIN rail terminal blocks from the DIN rail. Furthermore, the clamping device for mounting the DIN rail terminal blocks to the DIN rail is inexpensive. Furthermore, the clamping device for mounting the DIN rail terminal blocks to the DIN rail is having a sturdy construction. Still further, the clamping device of the present invention can be used for all control room equipments and in applications where vibration requirements are stringent. Furthermore, the clamping device of the present invention also achieves Electrical connectivity (grounding) required in electrical applications.

Wherever a range of values is specified, a value up to 10% below and above the lowest and highest numerical value respectively, of the specified range, is included in the scope of the invention.

While considerable emphasis has been placed herein on the specific preferred embodiments of the machine and system of the invention, it will be appreciated that many alterations can be made and that many modifications can be made in the preferred embodiment without departing from the principles of the inventions. These and other changes in the preferred embodiments as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A clamping device affixed to a base module for mounting the base module on a DIN rail, the clamping device comprising:
  a clamp base having a planar portion and a pair of side walls upstanding from said planar portion for orthogonally supporting the co-planar flanges of the DIN rail, the side walls of the clamp base including serrations that indent into DIN rail flange for facilitating electrical contact, the planar portion provided with an aperture for affixing the clamp base to the base module;
  a pair of actuator screws adapted to rotate and pass through the planar portion of the clamp base, each actuator screw adapted to move inward and outward with respect to the clamp base;
  a pair of push plates, wherein each of the push plates includes projections that fit into grooves located on opposite side walls of said clamp base, each of the push plates secured to a corresponding actuator screw and adapted to be either in a lifted configuration or a seated configuration based on movement of the actuator screw;
  a pair of clamping hooks hingeably supported between the side walls of the clamp base, wherein each clamping hook includes a first end supported by corresponding push plate and a second end with gripping jaws, the second end of the clamping hook adapted to move between an engaged configuration in which the second end is engaging with either of the co-planar flanges of the DIN rail for facilitating clamping of the DIN rail and a disengaged configuration in which the second end of the clamping hook is adapted to disengage from either of the co-planar flanges of the DIN rail; and
  a pair of springs, wherein each spring is supported on a spring pin disposed between the side walls of the clamp base, each spring is adapted to urge a corresponding clamping hook to a disengaged/open configuration when a corresponding push plate is in a seated configuration.

2. The clamping device as claimed in claim 1, wherein a pair of spacers are mounted on the spring pin to maintain the spring in operational configuration.

3. The clamping device as claimed in claim 1, wherein the clamp base is made from CR steel EN42 material.

4. The clamping device as claimed in claim 1, wherein the pair of actuator screws are made from Stainless steel of grade SS304.

5. The clamping device as claimed in claim 1, wherein the pair of push plates are made from Stainless steel of grade SS304/SS316.

6. The clamping device as claimed in claim 1, wherein the clamping hooks are made from steel of grade CR steel EN42.

7. The clamping device as claimed in claim 1, wherein the pair of springs are made from stainless steel of grade SS304.

* * * * *